May 25, 1943.  C. E. DENNIS ET AL  2,320,175

SYSTEM FOR TESTING RESONANT NETWORKS

Filed May 16, 1942

INVENTORS: C. E. DENNIS
A. HEINZ
BY
G. H. Heupt
ATTORNEY

Patented May 25, 1943

2,320,175

UNITED STATES PATENT OFFICE 2,320,175

SYSTEM FOR TESTING RESONANT NETWORKS

Charles E. Dennis, Jackson Heights, N. Y., and Alfred Heinz, Irvington, N. J., assignors to Western Electric Company, Incorporated, New York, N. Y., a corporation of New York Application May 16, 1942, Serial No. 443,325

7 Claims. (Cl. 175—183)

This invention relates to high frequency electrical testing systems and more particularly to a system for testing tuned networks and the component reactive elements comprising tuned networks.

In testing large quantities of tuned networks as well as the component reactive elements comprising such networks, it is very desirable to have a direct indicating instrument adapted to directly indicate either the absolute deviation or the percentage deviation from a previously established standard condition, for example, resonance. It is very desirable to have such a testing system capable of very rapidly giving a direct indication of not only the magnitude of the deviation from the standard condition but also the direction thereof.

It is an object of this invention to provide a simple, inexpensive apparatus capable of very rapidly and accurately indicating directly on an instrument scale the magnitude and direction of departure from a predetermined standard condition which a resonant network may assume or which any variable element thereof may assume.

It is a further object to provide an instrument capable of the above-described operation which, when once standardized by preliminary adjustment, requires no further adjustment while testing substantially like structures.

The foregoing objects are attained by this invention which provides in combination a source of alternating current of suitable frequency, a pair of vacuum tubes arranged in conventional balanced relation with input and output circuits, a direct current meter connected for differential action in the output circuits, a transformer with primary and secondary windings connected between the source and the input circuit to impress substantially equal voltages on each of the two input circuits, admittances effective between the primary and secondary windings, and means for inserting networks to be tested in the common leg of the input circuit.

The invention may be better understood by referring to the drawing in which.

Figure 1:
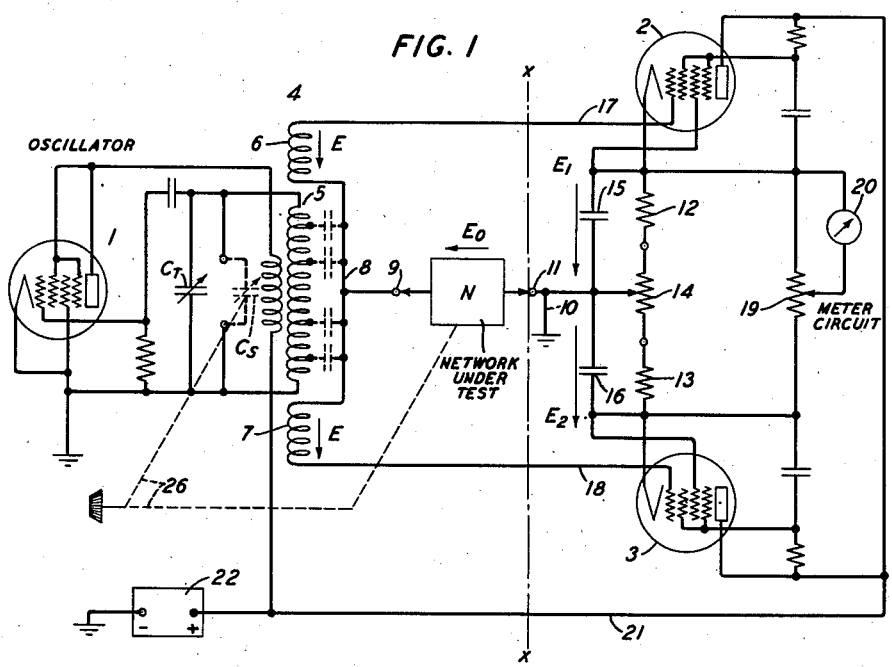
Fig. 1 is a schematic diagram representing a preferred embodiment of the invention.
Figure 5:
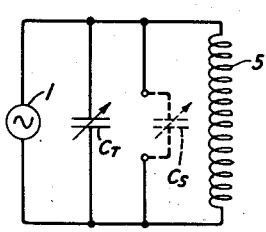
Fig. 5 is an alternative arrangement for the oscillator connection.

Referring now more particularly to Fig. 1 in which reference numeral 1 denotes a conventional form of oscillator commonly known as the tuned grid circuit type. This particular form of oscillator is not essential to the practice of this invention as other forms of oscillators such as the tuned plate circuit oscillator, the Hartley type oscillator, the Colpitts type oscillator or any of the electron coupled oscillators, all of which are well known in this art may be substituted. The tuned circuit of this oscillator comprises essentially an inductance 5 and capacitances $C_T$ and $C_S$. The mode of operation of this oscillator is so well known that further description thereof is unnecessary. In order to simplify the structure as well as to conserve materials, inductance 5 and capacitance $C_T$ and $C_S$ are shown as the tank circuit of oscillator 1. However, they may form a separately tuned circuit to which any form of oscillator may be connected as shown schematically in Fig. 5. Loosely coupled to this inductance coil 5 and symmetrically disposed thereabout are two secondary coils 6 and 7 which have induced therein substantially equal alternating current voltages E. Coils 5, 6 and 7 comprise in combination a loosely coupled radio frequency transformer generally denoted by reference numeral 4.

Two vacuum tubes 2 and 3 specifically shown herein in the form of pentodes but which may have any number of electrodes, are connected in conventional balanced relation. The two cathodes of these two tubes are joined through resistors 12, 13 and 14 and are by-passed for alternating current by condensers 15 and 16. The two control grids of these two tubes are connected by way of conductors 17 and 18 to the extreme terminals of coils 6 and 7, respectively. The adjacent terminals of coils 6 and 7 are joined by means of conductor 8 which is connected to test terminal 9. Resistor 14 is in the form of a potentiometer whose slider is connected to ground by way of lead 10 and also to test terminal 11.

Space current supply for all three tubes is furnished by a direct current power supply 22. The filaments for heating the cathodes of these tubes as well as the power supply therefor have been deleted for the sake of clarity as these circuits are so well known that they require no specific disclosure.

A potentiometer 19 is connected between the cathodes of tubes 2 and 3 bridging the bias resistors 12, 13 and 14. This potentiometer provides a voltage adjustment for a direct current meter 20.

Figure 2:
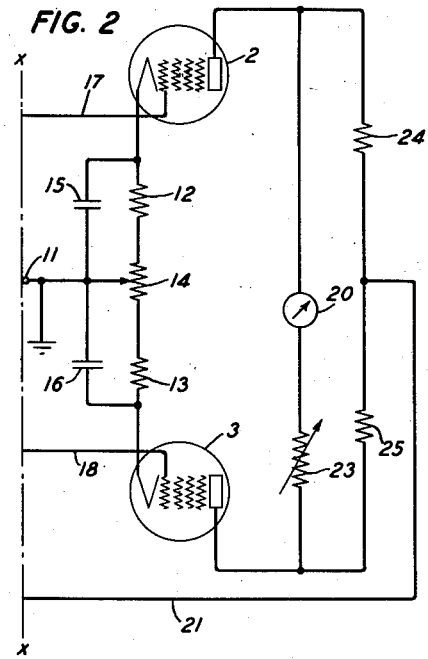
Fig. 2 is an alternative form of meter circuit for Fig. 1.

An alternative form of meter circuit is shown in Fig. 2. In both Fig. 1 and Fig. 2 the meter is connected for differential action in the output circuits of both tubes 2 and 3. In Fig. 1 the output circuits of tubes 2 and 3 are in their respective cathode circuits while in Fig. 2 resistors 24 and 25 comprise the principal output loads for tubes 2 and 3, respectively. These resistors are connected in the anode circuits of these tubes and meter 20 is connected through rheostat 23 to the two anodes. In so far as the operation of the meter is concerned, these two circuits are substantial equivalents and the circuit of Fig. 2 may be substituted for the meter circuit of Fig. 1 by disconnecting conductors 17, 18 and 21 from the meter circuit of Fig. 1 at line X—X and connecting them with the similarly numbered conductors of Fig. 2.

Figure 3:
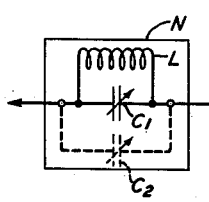
Fig. 3 illustrates a type of resonant network which may be tested by this invention.

Fig. 3 discloses one form of tuned network comprising inductance L and capacitances $C_1$ and $C_2$ which may be connected between test terminals 9 and 11 of Fig. 1.

The principle of operation of this invention may be understood by referring first to Fig. 1 in which it will be noted that one side of the primary coil 5 is connected to ground, while test terminal 11 is also connected to ground. Inherent stray admittances exist between primary 5 and secondaries 6 and 7 as well as conductor 8 which joins the near terminals of these two secondary coils. Some of these stray admittances are represented schematically by dotted lines in the form of a series of lumped capacitors between primary 5 and conductor 8. By reason of these stray admittances an alternating current is caused to pass therethrough from primary 5 to test terminal 9, through the network under test N, test terminal 11, ground conductor 10 and back to the grounded side of the primary coil 5. It should be remembered that this current is of exactly the same frequency as the voltage E induced in coils 6 and 7 by electromagnetic induction. This current which flows through the network under test N produces a voltage drop $E_0$ as shown in Fig. 1. Applicants have discovered that when this network is tuned to resonance with the frequency of the oscillator, voltage $E_0$ will be in exact quadrature with induced voltages E which are induced in coils 6 and 7. These voltages combine vectorially in the manner shown in Fig. 4. If measurements are to be made at lower frequencies, for example, at frequencies below 50 kilocycles, it is sometimes found necessary to supplement the stray admittances with a small condenser of about 1 or 2 micromicofarad connected between the upper end of primary 5 and conductor 8.

Figure 4:
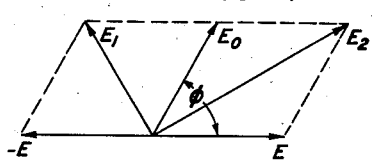
Fig. 4 is a vector diagram of the voltages appearing in the input circuit of the balanced vacuum tube arrangement.

In Fig. 4 phase angle $\phi$ is shown less than 90 degrees which is the condition existing when the network under test is not tuned to exact resonance with the frequency of the oscillator. In this condition voltage $E_2$ is greater than voltage $E_1$ thereby causing tube 3 to carry more space current than tube 2 whereby meter 20 will be caused to deflect in one direction from its mid-position. When network N is tuned to exact resonance with the frequency of the oscillator 1 angle $\phi$ becomes 90 degrees so that voltages $E_1$ and $E_2$ are exactly equal which causes meter 20 to return to its mid-zero position. On the other hand, if network N is detuned in the opposite sense voltage vector $E_1$ will be greater than voltage vector $E_2$ and will cause meter 20 to deflect in the opposite direction.

Many uses for this invention will be apparent to those skilled in the art. For example, intermediate frequency coils may be rapidly and accurately tested. To do this oscillator 1 is set for the desired intermediate frequency. Condenser $C_2$ of Fig. 3 may then be connected directly to test terminals 9 and 11, and a properly constructed and standardized intermediate frequency coil, for example, coil L of Fig. 3, temporarily connected in shunt thereof. Condenser $C_2$ is adjusted until meter 20 indicates zero deflection. Oscillator 1 may then be detuned a known percentage and potentiometer 19 adjusted until meter 20 indicates the same percentage on a previously calibrated scale. To check the accuracy of the calibration of the meter as well as the accuracy of balance of the meter circuit the oscillator 1 may then be adjusted to the same percentage off resonance in the opposite direction whereupon meter 20 should indicate the same percentage in the opposite sense. The oscillator 1 is then adjusted to the original intermediate frequency whereupon meter 20 should indicate at its mid-zero position. Other coils to be tested may then be substituted rapidly for the standard coil and the meter will indicate the amount of detuning in terms of percentage off resonant frequency. This indication is not only the magnitude of detuning but also the direction in which the coil is off resonance. Thus it will be seen that this invention permits the checking of a large number of similar coils very rapidly, gives a quantitative indication of the magnitude and direction the coil departs from standard condition and permits advantageous grouping of the coils or adjustments to make the coils of equal inductance.

It is evident that condensers may be checked in a similar way and if they contain variable elements they may be rapidly adjusted to correspond with a standard condenser.

Instead of indicating the deviation in per cent off resonant frequency, potentiometer 19 may be adjusted to cause meter 20 to indicate the actual inductance or capacitance deviation from resonance, the operation being the same as for frequency.

This invention has also been found very useful in aligning and tracking variable condensers. To do this a standard coil, for example coil L of Fig. 3, is connected to test terminals 9 and 11. A small trimmer condenser $C_1$ may be connected to the same terminals in parallel with coil L. The condenser $C_2$, the tracking whereof is to be checked, is also connected to test terminals 9 and 11 and mechanically ganged with a standard or reference condenser $C_S$ which is electrically connected across the oscillator tank as shown in Fig. 1. For this purpose it is preferable that the primary 5 be used as the oscillator tank coil as shown in Fig. 1 because this avoids the necessity of additionally tuning the primary 5 to the continuously changing oscillator frequency. The mechanical coupling means 26 is represented schematically in Fig. 1. As the two ganged condensers $C_S$ and $C_2$ are rotated by coupling means 26 throughout their operating range the frequency of oscillator 1 is caused to continuously vary from one limit to another. If condenser $C_2$ causes the tuned network N comprising coil L and condenser $C_2$ to remain tuned to resonance at all times with the frequency produced by oscillator 1, condenser C₂ is said to be perfectly tracked. Should condenser C₂ fail to tune network N so as always to maintain this network in resonance with the frequency coming from oscillator 1, meter 20 will indicate the amount of detuning in terms of percentage off resonant frequency. Condenser C₂ may be caused to track correctly by making the necessary adjustments to its plates in a manner well known to the art. This invention makes it practical to have any number of variable condensers track with each other interchangeably. The amount by which they deviate from proper tracking is indicated directly by the indicating meter 20 thus indicating at once the magnitude and direction by which the correction must be made.

Instead of adjusting condensers in the manner described above, variable condensers as well as fixed condensers may be grouped according to their characteristics so as to make the most advantageous use of them in circuits.

Another outstanding use of this invention is in testing dielectrics. For example, the product of the dielectric constant times the reciprocal of the thickness of any insulating material, such as mica, paper, etc., may be quickly indicated by meter 20 by inserting these materials between a pair of electrodes thereby forming a condenser and connecting this condenser to test terminals 9 and 11 as when testing condensers. Also, if the thickness of the samples is kept constant meter 20 will give a direct indication of the dielectric constant.

The above examples are illustrative of some of the uses to which this invention may be applied. Other uses will suggest themselves to those skilled in the art.

What is claimed is:

1. Means for testing reactances comprising two vacuum tubes each having an input circuit and an output circuit, a direct current indicator connected for differential action in the output circuits of both tubes, an alternating current source, a transformer comprising a primary and two secondry windings, the primary being connected to the current source and the secondaries being connected in conventional push-pull arrangement with the tube input circuits, admittances effective between the primary winding and the secondary windings, an impedance of given sign inserted in the common leg of the push-pull arrangement, and test terminals connected to said impedance for bridging it with an impedance of opposite sign to be tested.

2. Means for testing reactances comprising two vacuum tubes each having an input circuit and an output circuit, a direct current indicator connected for differential action in the output circuits of both tubes, an alternating current source, a transformer comprising a primary and two secondary windings, the primary being connected to the current source and tuned to the frequency thereof and the secondaries being connected in conventional push-pull arrangement with the tube input circuits, admittances effective between the primary winding and the secondary windings, an impedance of given sign inserted in the common leg of the push-pull arrangement, and test terminals connected to said impedance for bridging it with an impedance of opposite sign to be tested.

3. Means for testing reactances comprising two vacuum tubes each having an input circuit and an output circuit, a direct current indicator connected for differential action in the output circuits of both tubes, an alternating current source having a frequency determining means, a transformer comprising a primary and two secondary windings, the primary being connected to the current source and forming a part of the frequency determining means and the secondaries being connected in conventional push-pull arrangement with the tube input circuits, admittances effective between the primary winding and the secondary windings, an impedance of given sign inserted in the common leg of the push-pull arrangement, and test terminals connected to said impedance for bridging it with an impedance of opposite sign to be tested.

4. Means for testing resonant networks comprising two vacuum tubes each having an input circuit and an output circuit, a direct current indicator connected for differential action in the output circuits of both tubes, an alternating current source, a transformer comprising a primary and two secondary windings the primary being connected to the current source and the secondaries being connected in conventional push-pull arrangement with the tube input circuits, admittances effective between the primary winding and the secondary windings, test terminals in the common leg of the push-pull arrangement adapted for connecting in series therewith a resonant network to be tested.

5. Means for testing resonant networks comprising two vacuum tubes each having an input circuit and an output circuit, a direct current indicator connected for differential action in the output circuits of both tubes, an alternating current source, a transformer comprising a primary and two secondary windings, the primary being connected to the current source and tuned to the frequency thereof, and the secondaries being connected in conventional push-pull arrangement with the tube input circuits, admittances effective between the primary winding and the secondary windings, test terminals in the common leg of the push-pull arrangement adapted for connecting in series therewith a resonant network to be tested.

6. Means for testing resonant networks comprising two vacuum tubes each having an input circuit and an output circuit, a direct current indicator connected for differential action in the output circuits of both tubes, an alternating current source including a frequency determining means, a transformer comprising a primary and two secondary windings the primary being connected to the current source and forming a part of said frequency determining means, and the secondaries being connected in conventional push-pull arrangement with the tube input circuits, admittances effective between the primary winding and the secondary windings, test terminals in the common leg of the push-pull arrangement adapted for connecting in series therewith a resonant network to be tested.

7. Means for testing the tracking of variable condensers comprising two vacuum tubes each having an input circuit and an output circuit, a direct current indicator connected for differential action in the output circuits of both tubes, an alternating current source having a frequency determining means including a master variable condenser the tuning characteristic whereof is similar to that of the condenser to be tested, a transformer comprising a primary and two secondary windings, the primary being connected to the current source and forming a part of the frequency determining means, and the secondaries being connected in conventional push-pull arrangement with the tube input circuits, admittances effective between the primary winding and the secondary windings, an effective inductive reactance inserted in the common leg of the push-pull arrangement, test terminals connected to said inductive reactance for bridging it with the variable condenser to be tested, and a mechanical linkage coupling the movable elements of the master condenser and the condenser under test.

CHARLES E. DENNIS.
ALFRED HEINZ.